(12) United States Patent
Gallenberger et al.

(10) Patent No.: US 9,187,356 B2
(45) Date of Patent: Nov. 17, 2015

(54) BURNER HOLDER FOR A BURNER OF A MELTING VAT

(71) Applicant: HORN Glass Industries AG, Ploessberg (DE)

(72) Inventors: Sebastian Gallenberger, Theisseil (DE); Mohammed Bouziane, Georgenberg (DE); Wilhelm Soukup, Pleystein (DE); Jörg Buchmayer, Karlstadt (DE)

(73) Assignees: HORN GLASS INDUSTRIES AG, Ploessberg (DE); GERRESHEIMER LOHR GMBH, Lohr/Main (DE)

( * ) Notice: Subject to any disclaimer, the term of this patent is extended or adjusted under 35 U.S.C. 154(b) by 210 days.

(21) Appl. No.: 13/945,286

(22) Filed: Jul. 18, 2013

(65) Prior Publication Data

US 2014/0020429 A1    Jan. 23, 2014

(30) Foreign Application Priority Data

Jul. 18, 2012  (DE) .......................... 10 2012 014 154

(51) Int. Cl.
| | |
|---|---|
| *C03B 5/235* | (2006.01) |
| *F23C 5/02* | (2006.01) |
| *F23C 5/06* | (2006.01) |
| *C21C 5/52* | (2006.01) |
| *F27D 99/00* | (2010.01) |

(52) U.S. Cl.
CPC . *C03B 5/235* (2013.01); *F23C 5/06* (2013.01); *C21C 5/5217* (2013.01); *F27D 2099/0038* (2013.01)

(58) Field of Classification Search
CPC ......... C03B 5/235; C03B 5/2353; F23C 5/00; F23C 5/06
See application file for complete search history.

(56) References Cited

U.S. PATENT DOCUMENTS

| | | | |
|---|---|---|---|
| 1,299,968 A |  | 4/1919 | Lewis |
| 2,336,269 A |  | 12/1943 | Luellen |
| 2,338,623 A | * | 1/1944 | Crowe ............................ 432/74 |
| 3,703,968 A | * | 11/1972 | Uhrich et al. ................. 414/680 |
| 4,302,179 A | * | 11/1981 | Pont ............................... 431/189 |
| 4,554,000 A | * | 11/1985 | Suomala et al. ................ 65/129 |
| 4,809,956 A | * | 3/1989 | Donze ............................. 266/48 |
| 2003/0066373 A1 |  | 4/2003 | Maeguchi et al. |

FOREIGN PATENT DOCUMENTS

EP    0060483 A1    9/1982

OTHER PUBLICATIONS

European Search Report dated Oct. 10, 2013 for Application No. 13173183.8-1602.

* cited by examiner

*Primary Examiner* — Lisa Herring
(74) *Attorney, Agent, or Firm* — Lucas & Mercanti, LLP

(57) ABSTRACT

Burner holder for a burner of a melting vat, comprising a holding section for fastening the burner and a mounting section for fastening the holder to a melting vat or a vat element which is assigned to the melting vat, wherein the holding section (13) is connected via at least one parallel crank mechanism (8) to the mounting section (14) and can be moved via said at least one parallel crank mechanism (8) relative to the mounting section (14).

6 Claims, 4 Drawing Sheets

BURNER HOLDER FOR A BURNER OF A MELTING VAT

CROSS-REFERENCE TO RELATED APPLICATIONS

Figure 1:
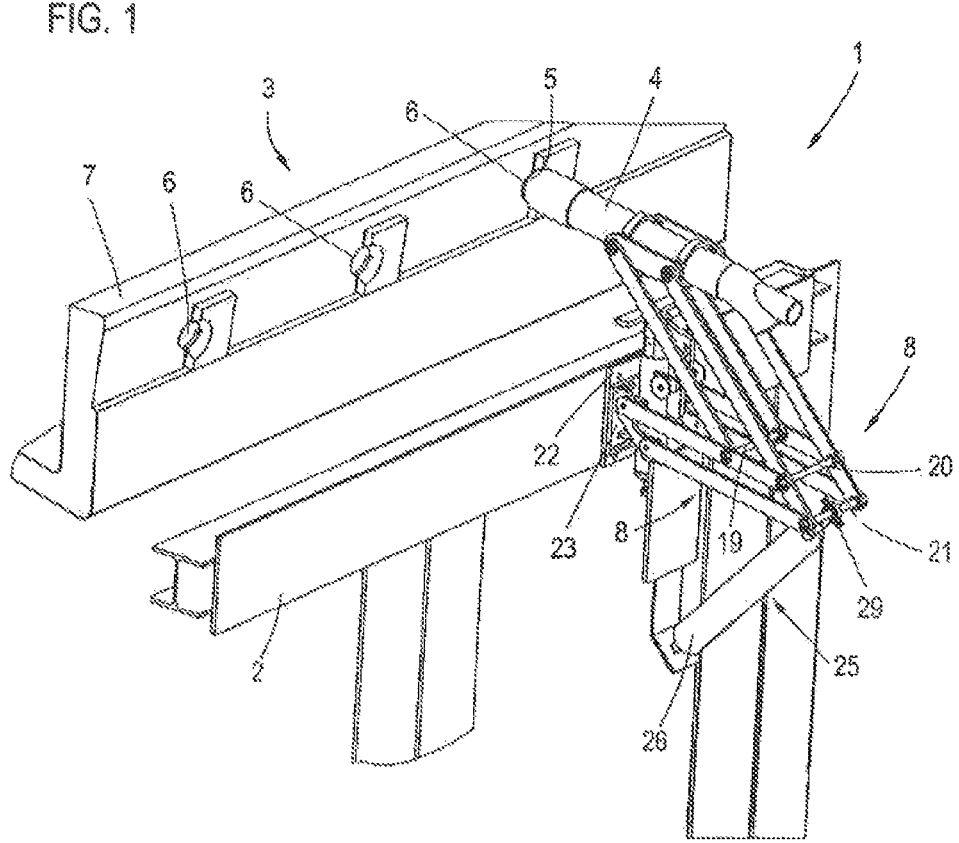

This application claims the priority of DE 10 2012 014 154.8 filed Jul. 18, 2012, which is incorporated by reference herein.

The invention relates to a burner holder for a burner of a melting vat, comprising a holding section for fastening the burner and a mounting section for fastening the holder to a melting vat.

Melting vats serve to melt solid materials, in order to obtain a molten mass with a predefined composition, which molten mass is then drawn from the melting vat and processed further. Very well known here are glass melting vats as part of melting furnaces, into which glass melting vats the mixture to be melted is added, and from which glass melting vats the molten glass mass which is obtained is then drawn off. In order to melt the mixture, remarkably high temperatures are required, to which end fuel is burnt. This takes place with the use as a rule of a plurality of burners which are arranged laterally along the melting vat and, by way of corresponding vat-side apertures in the vat wall, protrude into the melting vat or have access via said apertures.

The burners are arranged in each case on the burner holder which for its part is in turn fixed on the vat side. It is possible via the burner holder to orient the position or orientation of the burner relative to the melting vat and therefore also relative to the surface of the molten mass which is situated in the vat. That is to say, the angle, at which the burner which is as a rule configured as an elongate burner lance is positioned three-dimensionally and as a consequence blows into the vat, can be changed and set via said burner holder. This capability of changing the angle is relevant for the melting behavior of the mixture in the vat, and also for the position of what is known as the hot spot, that is to say the location of the highest temperature which is in turn decisive for the convection behavior within the molten mass. Burners of this type are used in different melting vat types such as end-fired furnaces or transverse-fired furnaces.

However, the previous adjustment has been very complicated; it takes place in a purely manual manner, by various connections having to be opened which make it possible to be able to move and adjust the burner, which various connections subsequently have to be tightened again, in order that the burner can be fixed. It is to be ensured in the process that the burner by remains in a fixed position and therefore consequently does not ultimately change its position within the vat opening, but rather is adjusted merely in a three-dimensional angle. This is because there is of course the problem in the case of a positional change that the burner tip is too close to the vat opening or is even accidentally pulled out of the latter to too great an extent, etc. All of this makes the manual adjustment complicated and expensive.

The invention is therefore based on the problem of specifying a burner holder for a lance-shaped burner of this type, which burner holder permits an exact adjustment of the burner lance in a simple way, combined with the option that the burner tip remains in a fixed position.

In order to solve this problem, it is provided according to the invention in a burner holder of the type stated at the outset that the holding section is connected via at least one parallel crank mechanism to the mounting section and can be moved via said at least one parallel crank mechanism relative to the mounting section.

In the burner holder according to the invention, a parallel crank mechanism is particularly advantageously provided, via which the holding section, to which the burner lance is fastened, can be moved relative to the mounting section, via which the burner holder is fixed on the vat side. Said parallel crank mechanism makes it possible that firstly the burner movement is initiated by a simple actuating movement which is introduced into the parallel crank drive, and it makes it possible secondly that, when the burner is mounted, the tip of the burner lance remains in a fixed position. The three-dimensional position or the three-dimensional angle of the burner therefore changes upon actuation of the parallel crank mechanism, but the tip remains in a fixed position relative to the vat opening.

Since ultimately the introduction of merely one actuating movement into the parallel crank mechanism is required, in order to make the uniform burner adjustment possible, the burner setting can take place as a result in a particularly simple and rapid manner, with simultaneous high precision and assurance that the tip is always in the correct position.

The parallel crank mechanism expediently has four struts which can be pivoted relative to one another and of which two first struts are mounted pivotably on the mounting section and two further struts are mounted pivotably on the holding section, the struts correspondingly being connected to one another in an articulated manner among one another. The specific construction of a parallel crank mechanism of this type will be described in detail in the following text.

One particularly expedient development of the invention provides that two parallel crank mechanisms which are arranged in parallel are provided, which parallel crank mechanisms are connected to one another at least partially via the respective pivot pins, about which the struts can be pivoted. A symmetrical construction is therefore provided here, the two parallel crank mechanisms being fastened on one side to the mounting section, and being mounted pivotably on the other side on the holding section, wherein they ultimately receive the burner lance between themselves in this region. Otherwise, the two parallel crank mechanisms are connected to one another via the pivot pins which are still free; that is to say, the pivot pins ultimately pass through from one to the other parallel crank mechanism.

Even if it is possible in principle to also perform the burner adjustment manually here, since merely the parallel crank mechanism or mechanisms have to be moved correspondingly, which is readily possible by pressing or pulling correspondingly on the parallel crank mechanism, one development which is particularly advantageous in contrast with this provides the integration of an actuating element for the automatic adjustment of the parallel crank mechanism or mechanisms. As a consequence, said automatic actuating element relieves the operator of the task of having to perform manual operations in this region. Rather, the corresponding burner adjustment can also be controlled from the outside with the use of the automatic actuating element. In the case of external control of this type, there is the possibility, moreover, of also performing this in a highly exact manner with detection of the actual burner angle and stipulation of a setpoint burner angle. Corresponding measuring or sensor elements relating to the actual and setpoint angles, etc. can be integrated readily on the holder side. Only one single actuating element is also required for the entire adjustment, with the result that the holder construction is simplified.

The actuating element itself is expediently arranged on one side on the mounting section and on the other side in the region of a pivot bearing, via which two struts are connected to one another pivotably. Via this, a corresponding actuating movement can be introduced via the actuating element into the parallel crank mechanism or mechanisms in a very simple way.

For example, a pneumatic or hydraulic cylinder which can be actuated via a corresponding pneumatic or hydraulic controller can be used as actuating element. Moreover, the associated control device can communicate as described with corresponding sensor elements if the latter are provided in order to tap off corresponding angle information.

As an alternative to this, the use of a screw drive which can be actuated via a motor, in particular a ball screw drive, as actuating element is also conceivable. Here too, the motor can be actuated and the screw drive can be operated via a corresponding control device which optionally in turn has corresponding angular sensor data available.

In order not only to make a pivoting adjustment of the burner possible, which is realized according to the invention via the parallel crank mechanism or mechanisms, but rather also to make height adjustability possible, in order to position the burner in principle in its height or vertical position relative to the vat opening, one expedient development of the invention provides that the parallel crank mechanism or mechanisms can be adjusted and locked relative to the mounting section via an adjusting device. A fundamental vertical orientation can therefore take place via said adjusting device. Here, the adjusting device can comprise a screw drive or can be configured as such, It can be manually operable, for example via a simple crank or a rotary wheel, via which a threaded rod is rotated, on which the parallel crank mechanism or mechanisms runs/run via a suitable guide, or the like. In addition, of course, motorized refinements are once again conceivable, for example with the use of a screw drive with an associated actuating motor.

In addition to the burner holder itself, the invention relates, furthermore, to a melting vat comprising at least one burner holder of the described type. It goes without saying that a plurality of burner holders of this type together with associated burners are usually installed on a melting vat of this type, for example of a glass melting vat.

Figure 2:
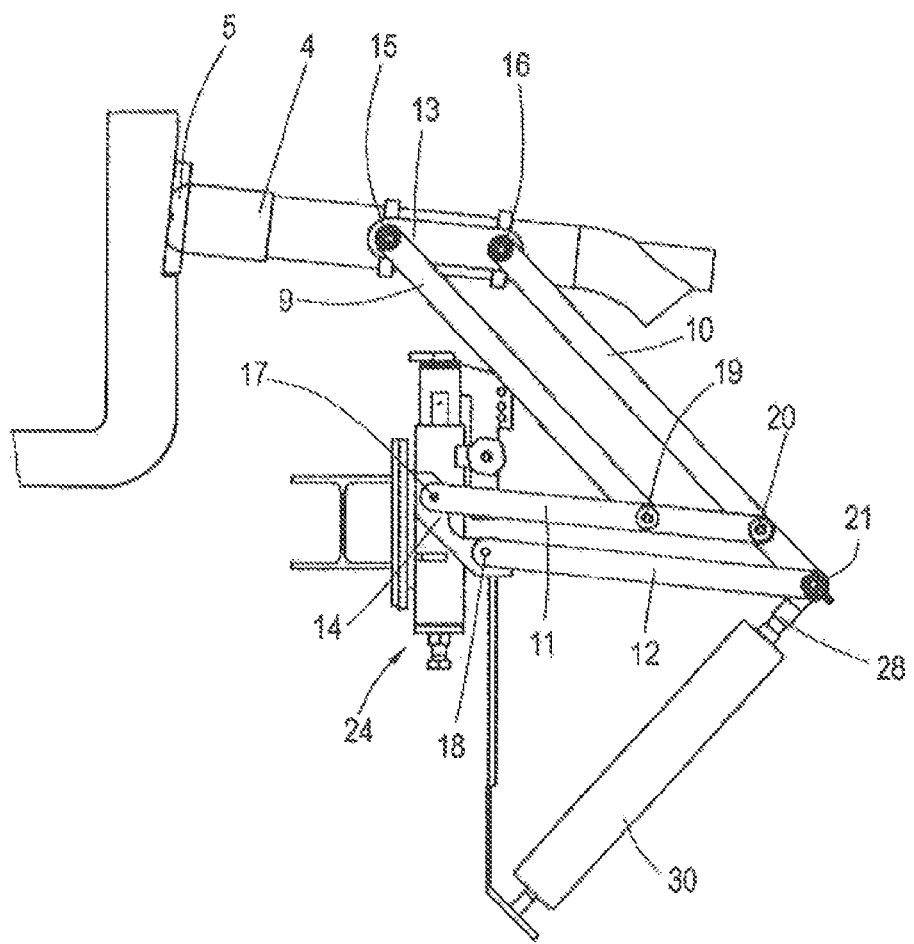
Figure 3:
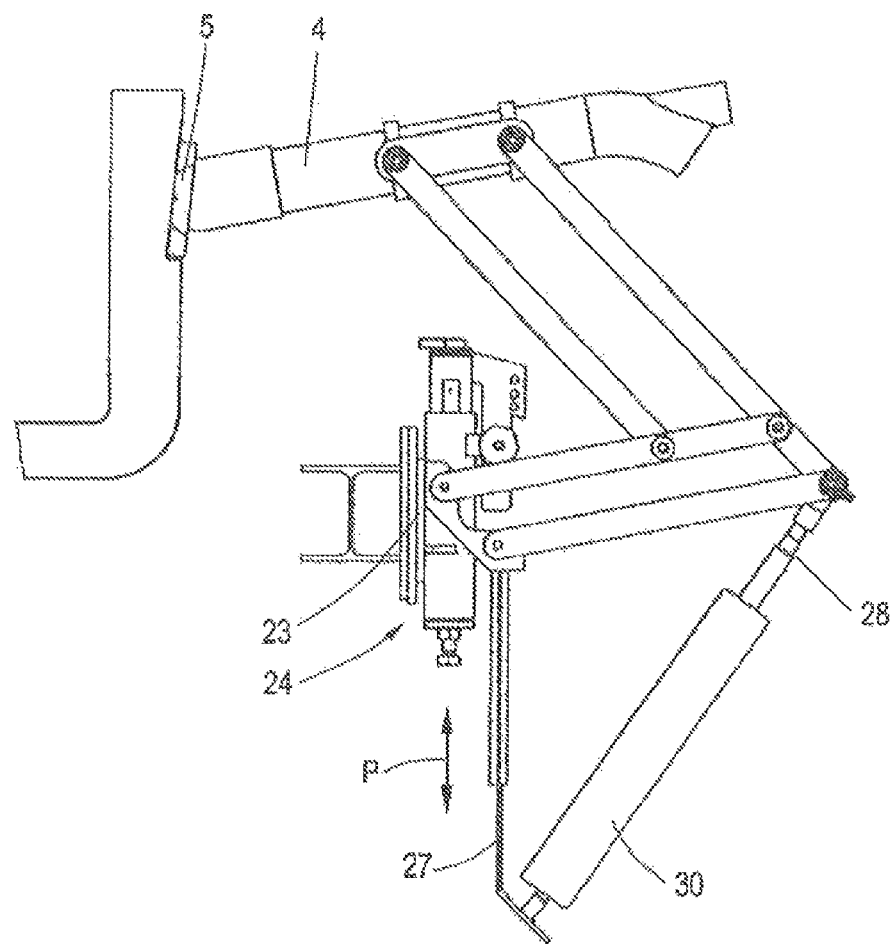
Figure 4:
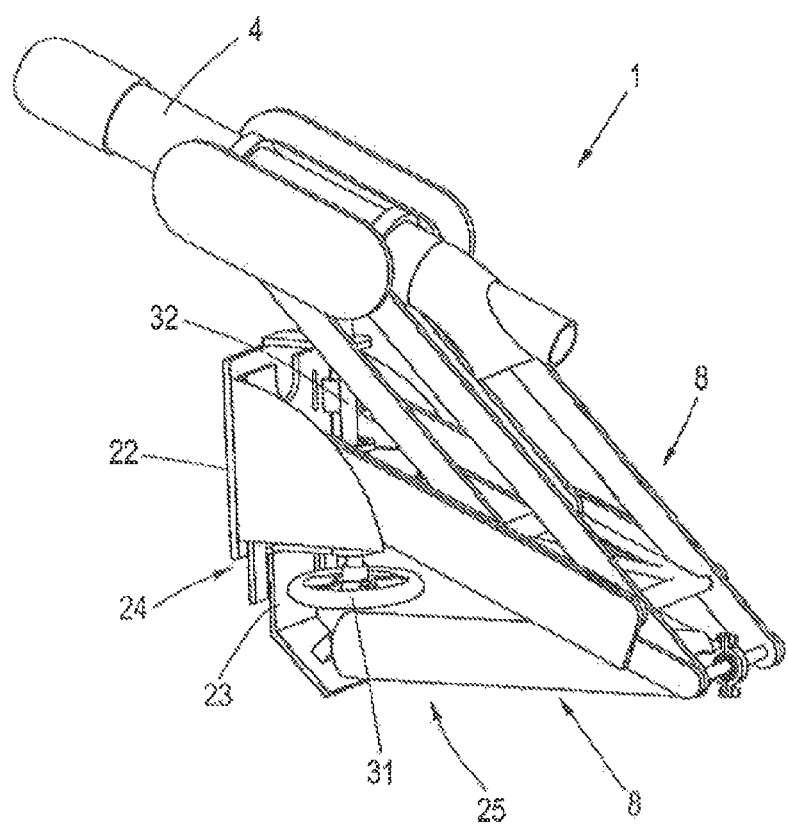

Further advantages, features and details of the invention result from the exemplary embodiment which is described in the following text, and using the drawings, in which:

FIG. 1 shows a perspective view of a burner holder according to the invention with a burner in its mounting position on a melting vat, in a partial view, FIG. 2 shows a side view of the arrangement from FIG. 1 with a burner holder which is situated in a first position, FIG. 3 shows a side view in accordance with FIG. 2 with an adjusted burner holder, and FIG. 4 shows a perspective view of a burner holder according to the invention of a second embodiment.

FIG. 1 shows a burner holder 1 according to the invention which is arranged on a carrying frame 2 of a melting vat 3, for example a glass melting vat. A burner lance 4 is received in a holding section 13 in the burner holder 1, which burner lance 4 is fixed and can be adjusted via the holder. The burner lance 4 has a burner tip 5 which protrudes into an opening 6, of which a plurality are provided on the melting vat wall 7, since a plurality of burner lances 4 are usually provided. The burner holder according to the invention then permits an angular adjustment of the burner lance 4, that is to say the burner lance 4 can be pivoted up and down, the burner tip 5 remaining in a fixed position however, consequently therefore the center point, about which the burner lance 4 is pivoted via the burner holder 1, is ultimately the burner tip 5.

For this purpose, the burner holder 1 has two parallel crank mechanisms 8 which are connected in parallel and are in each case of identical configuration, for which reason only one of the two parallel crank mechanisms 8 will be described in greater detail in the following text. Each of the parallel crank mechanisms 8 comprises four struts 9, 10, 11, 12 (see FIG. 2), wherein the two struts 9, 10 are arranged pivotably on a holding section 13 for the burner lance 4, whereas the two struts 11, 12 are arranged pivotably on a mounting section 14, via which the burner holder 1 is fixed on the vat side. The struts 9, 10 therefore pivot about the pivot pins 15, 16, whereas the struts 11, 12 pivot about the pivot pins 17, 18. Moreover, the struts 9, 10, 11, 12 are also pivotably connected among one another partially. The strut 9 is connected pivotably to the strut 11, to be precise at the pivot pin 19. The strut 10 is finally connected movably to the strut 11 via the pivot pin 20 and to the strut 12 via the pivot pin 21.

As FIG. 1 shows, the two struts 9 and 10 are arranged on both sides of the holding section 13; correspondingly, the struts 11 and 12 of the two parallel crank mechanisms 8 are also positioned such that they are spaced apart from one another. As FIG. 1 shows, the pivot pins 19, 20 and 21 extend between the two parallel crank mechanisms 8, that is to say connect both to one another.

As has been described, the two parallel crank mechanisms 8 are arranged on the mounting section 14. Said mounting section 14 is ultimately of two-piece configuration. It comprises firstly the fastening section 22, via which the burner holder 1 is fixed directly on the vat side. Furthermore, it comprises a fastening section 23, to which the two struts 10, 11 are fastened pivotably and which can be moved vertically relative to the first fastening section 22 via an adjusting device 24, with the result that the two parallel crank mechanisms 8 and, with them, the burner lance 4 can be moved vertically. The adjusting device 24 is configured, for example, as a screw drive. This makes it possible, for example, for the burner holder 1 to be able to be adjusted and positioned manually after it has been mounted on the melting vat, wherein it goes without saying that the adjusting device can then be fixed in the desired setting position. The vertical movability is shown by the double arrow P in FIG. 3.

Furthermore, an actuating element 25 is provided, in the form of a hydraulic or pneumatic cylinder 26 in the exemplary embodiment which is shown, which actuating element 25 serves for the adjustment or movement of the two parallel crank mechanisms 8 and therefore also of the burner lance 4. The hydraulic or pneumatic cylinder 26 is firstly arranged such that it can be pivoted or tilted on a holding section 27 of the fastening section 23; it is supported there in a fixed position. The other end, that is to say the extendable piston 28, see FIG. 1, is fastened to the pivot pin 21 in a suitable pivotable holder 29. If the piston 28 is therefore extended or retracted, the parallel crank mechanism pair 8 is also moved as a consequence.

The function of said actuating devices and therefore of the parallel crank mechanisms 8 results from FIGS. 2 and 3. FIG. 2 shows a situation, in which the piston 28 is retracted, that is to say it is situated in the cylinder 30. As FIG. 2 shows, the burner lance 4 is also situated with its burner tip 5 in a first setting position, in which it is set so as to point slightly obliquely upward with its tip, see FIG. 2.

If an angular adjustment is then to take place, consequently therefore the burner lance 4 is to assume a different three-dimensional angle, but at the same time the burner tip 5 is to remain in a fixed position, the piston 28 is extended by actuation of the actuating element 25 via a suitable control device which controls the supply of compressed air or hydraulic fluid here. The piston 28 is connected to the pivot pin 21. Every extending movement, no matter how small, leads to the piston 28 pressing onto the pivot pin 21 and therefore onto the parallel crank mechanisms 8. The latter are pivoted about the two pivot pins 17, 18, but at the same time the struts 9, 10 also pivot relative to the struts 11, 12 about the pivot pins 19, 20, 21, just as the struts 9, 10 on the holding section side pivot about the pivot pins 15, 16, As a consequence of the strut coupling, the movement is such that the burner lance 4 is ultimately pivoted about the burner tip 5 as pivot point. The right-hand end of the burner lance 4 which is shown in FIGS. 2 and 3 is therefore, as it were, pivoted vertically about the burner tip 5 as pivot point. The piston 28 is extended until the desired angular adjustment is performed or the desired three-dimensional angle is reached. It can be seen in FIG. 3 that the burner lance then points downward with the burner tip 5 here.

It goes without saying that it is possible to assume every desired intermediate angle between the maximum retracted position and the maximum extended position of the piston 28 in a fixed and locked manner. As described, the control takes place via a central control device which preferably controls all actuating elements 25 which are provided on the vat side but which can preferably be actuated separately via the control device, in order for it to be possible to adjust each burner holder and therefore each burner lance 4 individually. The adjustment can take place depending on any input program commands concerning the adjusting angle. That is to say, the operator inputs the desired burner lance angle, for example, at a suitable operating desk, which desired burner lance angle is then implemented by the control device in conjunction with the burner holder or holders 1. For this purpose, one or more sensors which measure the actual angle which the burner lance 4 assumes can be provided on the holder side, via which sensors the angular change owing to the adjustment can then be detected. The adjusting operation ends automatically when the desired setpoint angle is reached. There is no need for any manual operations in conjunction with this.

In the form of a basic illustration, FIG. 4 shows a burner holder 1 according to the invention for a burner lance 4, which burner holder 1 is of approximately identical construction to the burner holder 1 from FIGS. 1 to 3. Here too, two parallel crank mechanisms 8 which are connected in parallel are therefore provided, as is an actuating element 25 which serves to pivot the burner lance 4. Here too, as in the embodiment according to FIGS. 1 to 3, advantageously only a single actuating element is required, in order to perform the adjusting operation, that is to say the complete pivoting operation is possible by way of the activity of a single actuating means, the hydraulic or pneumatic cylinder 26 by way of example here.

Whereas a vertical adjusting possibility is also provided in the embodiment which is shown in FIG. 4, in which the mounting section 14 comprises a first fastening section 22 and a second fastening section 23 which is movable relative to the former, in contrast to the adjusting device 24 which is shown in FIGS. 1 to 3 comprising a screw drive, for example a ball screw drive, a handwheel 31 is provided in the embodiment according to FIG. 4, via which handwheel 31 a threaded spindle 32 can be turned, on which a corresponding driver nut runs, via which the second fastening section 23 together with the parallel crank mechanisms 8 etc. is driven and moved vertically.

The invention claimed is:
1. Burner holder for a burner of a melting vat, comprising:
a holding section for fastening to a burner;
a mounting section for fastening to a melting vat;
two parallel crank mechanisms connecting the holding section to the mounting section such that the holding section can be moved relative to the mounting section, each of the parallel crank mechanisms having four struts including first and second struts pivotally connected to the holding section and third and fourth struts pivotally connected to the mounting section, the first and second struts being pivotable relative to the third and fourth struts such that the first and second struts are always parallel to each other and the third and fourth struts are always parallel to each other,
the two parallel crank mechanisms are connected in parallel to each other between the holding section and the mounting section and are connected to each other at least partially via respective pivot pins about which the four struts can be pivoted; and
an actuating element configured to automatically adjust the two parallel crank mechanisms, wherein one side of the actuating element is connected to the mounting section and another side of the actuating element is connected to one of the pivot pins.

2. Burner holder according to claim 1, wherein the two parallel crank mechanisms are height-adjustable via an adjusting device.

3. Burner holder according to claim 2, wherein the adjusting device comprises a screw drive.

4. Burner holder according to claim 1, wherein the actuating element is a pneumatic or hydraulic cylinder or a screw drive which can be actuated via a motor.

5. Melting vat, comprising at least one burner and a burner holder, the burner holder comprising:
a holding section for fastening to the burner;
a mounting section for fastening to the melting vat;
two parallel crank mechanisms connecting the holding section to the mounting section such that the holding section can be moved relative to the mounting section, each of the parallel crank mechanisms having four struts including first and second struts pivotally connected to the holding section and third and fourth struts pivotally connected to the mounting section, the first and second struts being pivotable relative to the third and fourth struts such that the first and second struts are always parallel to each other and the third and fourth struts are always parallel to each other,
the two parallel crank mechanisms are connected in parallel to each other between the holding section and the mounting section and are connected to each other at least partially via respective pivot pins about which the four struts can be pivoted; and
an actuating element configured to automatically adjust the two parallel crank mechanisms, wherein one side of the actuating element is connected to the mounting section and another side of the actuating element is connected to one of the pivot pins.

6. The melting vat of claim 5, wherein the two parallel crank mechanisms and the actuating element are configured so that a burner tip of the burner that faces the melting vat is a center point about which the burner is pivoted during an adjustment of the parallel crank mechanisms.

* * * * *